US012621236B2

(12) United States Patent
Young et al.

(10) Patent No.: US 12,621,236 B2
(45) Date of Patent: May 5, 2026

(54) LAG 1+1 HANDOFF BETWEEN PACKET AND OTN

(71) Applicant: Ciena Corporation, Hanover, MD (US)

(72) Inventors: Alexander Young, Ottawa (CA);
Rajagopalan Kannan, Gurgaon (IN);
Kalp Desai, Mumbai (IN);
Chandrasekhar Viswanathan, Mumbai
(IN); Matthew Yuen, Ottawa (CA);
Sitaram Patro, Stittsville (CA);
Matthew Danby Jemmeson, Ottawa
(CA)

(73) Assignee: Ciena Corporation, Hanover, MD (US)

( * ) Notice: Subject to any disclaimer, the term of this
patent is extended or adjusted under 35
U.S.C. 154(b) by 92 days.

(21) Appl. No.: 18/536,130

(22) Filed: Dec. 11, 2023

(65) Prior Publication Data

US 2025/0141785 A1      May 1, 2025

(30) Foreign Application Priority Data

Oct. 27, 2023      (IN) ............................. 202311073275

(51) Int. Cl.
H04L 45/24          (2022.01)
H04L 45/00          (2022.01)
H04L 45/28          (2022.01)
(52) U.S. Cl.
CPC ............ H04L 45/245 (2013.01); H04L 45/28
(2013.01); H04L 45/62 (2013.01)
(58) Field of Classification Search
CPC ........ H04L 45/245; H04L 45/28; H04L 45/62
See application file for complete search history.

(56) References Cited

U.S. PATENT DOCUMENTS 6,490,244 B1    12/2002  Pegrum et al.
6,501,762 B1    12/2002  Pillar et al.
6,516,417 B1     2/2003  Pegrum et al.
6,996,102 B2     2/2006  Pegrum et al.
(Continued)

OTHER PUBLICATIONS

T. Hashiguchi, Y. Takita, K. Tajima and T. Katagiri, "Packet/OTN/
WDM network dimensioning employing minimum necessary packet
Re-Aggregation for fine-grained traffic," 2014 (Year: 2014).*
(Continued)

*Primary Examiner* — Messeret F Gebre
(74) *Attorney, Agent, or Firm* — Baratta Law PLLC;
Lawrence A. Baratta, Jr.

(57) ABSTRACT

A network element includes a plurality of ports including a
first set of ports configured to connect to a router via a Link
Aggregation and a second set of ports configured to com-
municatively connect to another network element via 1+1
protection over a Time Division Multiplexing (TDM) net-
work; and circuitry interconnecting the plurality of ports and
configured to perform a first bridge and select function to
convert the Link Aggregation protection associated with the
first set of ports to a single connection, and perform a second
bridge and select function to convert the single connection
to the 1+1 protection associated with the second set of ports.
The first bridge and select function and the second bridge
and select function are each configured to close one type of
protection and open another type of protection.

20 Claims, 16 Drawing Sheets

How to connect to routers across an OTN network with no single point of failure and
independent failure tolerance in fault domains A, B and C.

(56) References Cited

U.S. PATENT DOCUMENTS

| | | | |
|---|---|---|---|
| 7,206,309 | B2 | 4/2007 | Pegrum et al. |
| 7,430,173 | B2 | 9/2008 | St. Denis et al. |
| 7,512,674 | B1 | 3/2009 | Jain et al. |
| 7,568,047 | B1 | 7/2009 | Aysan et al. |
| 8,718,471 | B2 | 5/2014 | Prakash et al. |
| 8,854,955 | B2 | 10/2014 | Prakash et al. |
| 9,236,953 | B2 | 1/2016 | Chhillar et al. |
| 9,264,139 | B2 | 2/2016 | Young et al. |
| 9,407,359 | B2 | 8/2016 | Swinkles et al. |
| 9,497,521 | B2 | 11/2016 | Sareen et al. |
| 9,538,264 | B2 | 1/2017 | Surek et al. |
| 10,003,867 | B2 | 6/2018 | Prakash et al. |
| 10,027,574 | B2 | 7/2018 | Sareen et al. |
| 10,158,448 | B2 | 12/2018 | Prakash et al. |
| 10,187,144 | B2 | 1/2019 | Prakash et al. |
| 2006/0146790 | A1 | 7/2006 | Caballero-McCann et al. |
| 2007/0140235 | A1 | 6/2007 | Aysan et al. |
| 2007/0201459 | A1 | 8/2007 | Bao et al. |
| 2015/0365294 | A1 | 12/2015 | Khan et al. |
| 2015/0365739 | A1 | 12/2015 | Juneja et al. |
| 2016/0043797 | A1 | 2/2016 | Sareen et al. |
| 2016/0241464 | A1* | 8/2016 | Modena ............ H04L 12/40182 |
| 2019/0132045 | A1* | 5/2019 | Nadahalli ............ H04B 10/075 |
| 2021/0351855 | A1 | 11/2021 | Brown et al. |

OTHER PUBLICATIONS

S. J. Trowbridge, "High-Speed Ethernet Transport [Standards Topics]," in IEEE Communications Magazine, vol. 45, No. 12, pp. 120-125, Dec. 2007, (Year: 2007).*

* cited by examiner

How to connect to routers across an OTN network with no single point of failure and independent failure tolerance in fault domains A, B and C.

We can tolerate one path failure in the OTN fault domain but unprotected drop has multiple single points of failure in fault domains A and C.

Using the OTN Transport network to create LAG legs between routers ensures no single point of failure but does not provide independent resilience between fault domains. One path must be fault free in all 3 domains to support the end-to-end service.

By closing and reopening protected hand-off from drop side to OTN network side we can tolerate one independent path failure per fault domain. The problem is how to make a protected hand-off using OTN switching techniques on one side and packet switching techniques on the other.

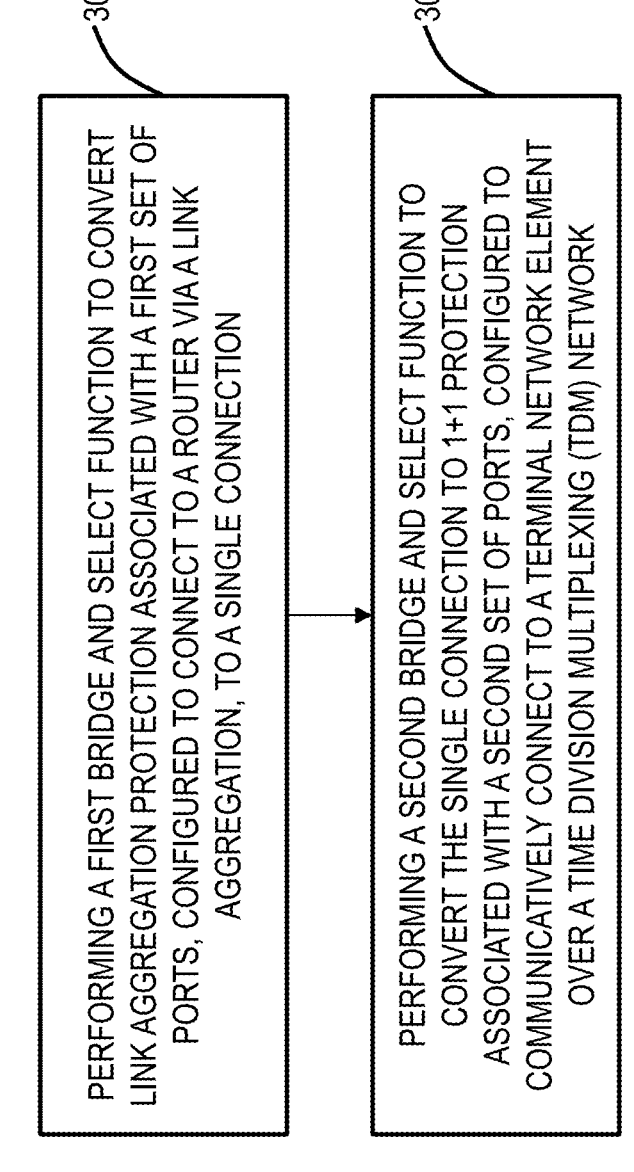

300

302

PERFORMING A FIRST BRIDGE AND SELECT FUNCTION TO CONVERT LINK AGGREGATION PROTECTION ASSOCIATED WITH A FIRST SET OF PORTS, CONFIGURED TO CONNECT TO A ROUTER VIA A LINK AGGREGATION, TO A SINGLE CONNECTION

304

PERFORMING A SECOND BRIDGE AND SELECT FUNCTION TO CONVERT THE SINGLE CONNECTION TO 1+1 PROTECTION ASSOCIATED WITH A SECOND SET OF PORTS, CONFIGURED TO COMMUNICATIVELY CONNECT TO A TERMINAL NETWORK ELEMENT OVER A TIME DIVISION MULTIPLEXING (TDM) NETWORK

*FIG. 16*

LAG 1+1 HANDOFF BETWEEN PACKET AND OTN

FIELD OF THE DISCLOSURE

The present disclosure relates generally to networking and computing. More particularly, the present disclosure relates to systems and methods for a Link Aggregation Group (LAG) 1+1 handoff between a packet network and Optical Transport Network (OTN).

BACKGROUND OF THE DISCLOSURE

Networks are realized at various layers including Layer 1 which uses Time Division Multiplexing (TDM) such as OTN and Layer 2 for packets such as Ethernet. Of note, an end-to-end service may include various domains such as a packet domain, i.e., User-Network Interface (UNI), at a first router or packet switch and at a second router or packet switch, and an optical domain, i.e., Network-Network Interfaces (NNIs), interconnecting the first router/packet switch and the second router/packet switch. The end-to-end service can require protection where the service is able to reroute due to faults (e.g., fiber cut, equipment failure, etc.). An example of protection includes so called 1+1 where there is a working path with a corresponding protection path. If there is a fault on the working path, the service switches to the protection path. For example, 1+1 can be used in an OTN network. Another example of protection includes a Link Aggregation Group (LAG) in the packet domain. Link Aggregation is described, e.g., in IEEE 802.1AX-2020, Standard for Local and Metropolitan Area Networks-Link Aggregation, the contents of which are incorporated by reference in their entirety. A LAG combines multiple parallel packet ports into a single logical link and can be used to protect the packet domain, i.e., when one or more of the parallel packet ports fail, the remaining ports can provide resilience. Again, an end-to-end service (which is also referred to herein as just a service) can include both a Layer 1 and Layer 2 component, each of which can include their own protection, e.g., 1+1 at Layer 1 and LAG at Layer 2.

BRIEF SUMMARY OF THE DISCLOSURE

The present disclosure relates to systems and methods for a Link Aggregation Group (LAG) 1+1 handoff between a packet network and Optical Transport Network (OTN). The present disclosure addresses the problem of how to connect to routers across an OTN network with no single point of failure and independent failure tolerance in fault domains A, B, C, where domains A and C are the routers and domain B is the OTN network interconnecting the routers. Logically, to provide a LAG 1+1 handoff, the present disclosure includes two separate bridge and select functions, one in the packet domain and one in the OTN domain. An end-to-end service will include two of these LAG 1+1 handoffs, namely between the domains A, B and the domains B, C. Two example implementations are described of the logical two separate bridge and select functions, namely an OTN LAG drop handoff approach and a packet LAG handoff approach. The OTN LAG drop handoff approach involves injection of Remote Fault (RF) defect to control the LAG selection and distribution while still providing awareness of genuine LAG leg faults. The packet LAG approach involves a Virtual Local Area Network (VLAN) Ethernet Tree (ETREE) construct to perform packet layer bridging from the packet to TDM domain and ingress control via Interlaken (ILKN) to convert TDM bridging function to a LAG like distribution function in the direction from TDM domain to L2.

In an embodiment, a network element includes a plurality of ports including a first set of ports configured to connect to a router via a Link Aggregation and a second set of ports configured to communicatively connect to another network element via 1+1 protection over a Time Division Multiplexing (TDM) network; and circuitry interconnecting the plurality of ports and configured to perform a first bridge and select function to convert the Link Aggregation protection associated with the first set of ports to a single connection, and perform a second bridge and select function to convert the single connection to the 1+1 protection associated with the second set of ports. The first bridge and select function and the second bridge and select function can each be configured to close one type of protection and open another type of protection.

The network element can further include a TDM switching fabric configured to switch the single connection. To perform the second bridge and select function, the circuitry can be configured to implement (1) a bridge of the single connection to the second set of ports and (2) a select from the second set of ports to the single connection. To perform the first bridge and select function, the circuitry can be configured to implement a packet Link Aggregation Group (LAG) which utilizes a virtual switch in the terminal network element and an Ethernet Tree (ETREE) to (1) select from the first set of ports to the single connection and (2) bridge from the single connection to the first set of ports.

The TDM network can utilize Optical Transport Network (OTN). To perform the first bridge and select function, the circuitry can be configured to implement an OTN Link Aggregation Group (LAG) which (1) manually introduces errors on an inactive leg of the first set of ports to select from the first set of ports to the single connection and (2) bridges from the single connection to the first set of ports. To perform the first bridge and select function, the circuitry can be configured to (1) manually introduce errors on an inactive leg of the first set of ports to select from the first set of ports to the single connection and (2) bridge from the single connection to the first set of ports. Responsive to a failure in the TDM network, the circuitry can be configured to holdoff protection switching to the Link Aggregation so that the 1+1 protection is implemented first.

In another embodiment, a method includes performing a first bridge and select function to convert Link Aggregation protection associated a first set of ports, configured to connect to a router via a Link Aggregation, to a single connection; and performing a second bridge and select function to convert the single connection to 1+1 protection associated with a second set of ports, configured to communicatively connect to a network element over a Time Division Multiplexing (TDM) network. The first bridge and select function and the second bridge and select function can each be configured to close one type of protection and open another type of protection. The method can further include switching the single connection via a TDM switching fabric; and implementing the first bridge and select function and the second bridge and select function, via the TDM switching fabric.

The performing the second bridge and select function can include implementing (1) a bridge of the single connection to the second set of ports and (2) a select from the second set of ports to the single connection. The performing the first bridge and select function can include implementing a packet Link Aggregation Group (LAG) which utilizes a virtual switch and an Ethernet Tree (ETREE) to (1) select from the first set of ports to the single connection and (2) bridge from the single connection to first set of ports. The TDM network can utilize Optical Transport Network (OTN). The performing the first bridge and select function can include implementing an OTN Link Aggregation Group (LAG) which (1) manually introduces errors on an inactive leg of the first set of ports to select from the first set of ports to the single connection and (2) bridges from the single connection to the first set of ports.

The performing the first bridge and select function can include manually introducing errors on an inactive leg of the first set of ports to select from the first set of ports to the single connection and (2) bridge from the single connection to the first set of ports. The method can further include, responsive to a failure in the TDM network, holding off protection switching to the Link Aggregation so that the 1+1 protection is implemented first.

In a further embodiment, a switching circuit is configured to perform steps of performing a first bridge and select function to convert Link Aggregation protection associated a first set of ports, configured to connect to a router via a Link Aggregation, to a single connection, and performing a second bridge and select function to convert the single connection to 1+1 protection associated with a second set of ports, configured to communicatively connect to a network element over a Time Division Multiplexing (TDM) network. The first bridge and select function and the second bridge and select function can each be configured to close one type of protection and open another type of protection.

BRIEF DESCRIPTION OF THE DRAWINGS

The present disclosure is illustrated and described herein with reference to the various drawings, in which like reference numbers are used to denote like system components/method steps, as appropriate, and in which:

FIG. 16 is a flowchart of a process for a LAG 1+1 handoff,

DETAILED DESCRIPTION OF THE DISCLOSURE

Again, the present disclosure relates to systems and methods for a Link Aggregation Group (LAG) 1+1 handoff between a packet network and Optical Transport Network (OTN). The techniques described herein are used to support handoff from packet to TDM networking equipment with no single point of failure and resiliency to tolerate independent failures in the near-end handoff domain, the TDM network, and the far-end handoff domain.

Problem Statement

Figures 14, 15:
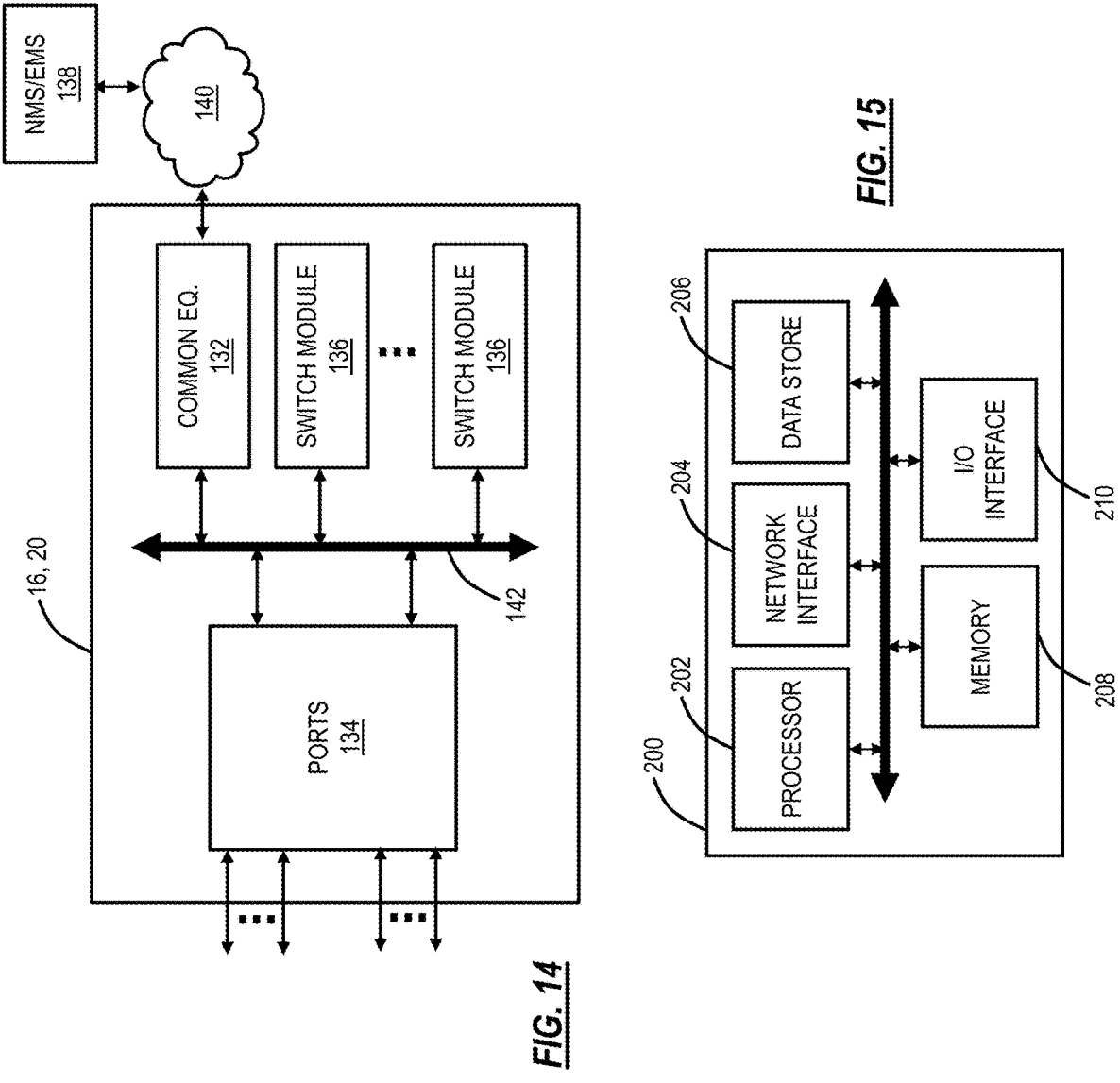
FIG. 14 is a block diagram of an example terminal network element for use with the systems and methods described herein.
FIG. 15 is a block diagram of an example processing device.

FIGS. 1-4 are network diagrams illustrating a multi domain network 10 having domains A, B, C for illustrating the problem statement. For illustration purposes, the multi domain network is illustrated with single lines; those skilled in the art understand this represents logical connectivity, independent of protocol (i.e., Ethernet, OTN), and each line is a bidirectional connection in a practical implementation. The domain A can be referred to as the near-end handoff domain and includes a router 12. The domain B includes a TDM network 14, such as an OTN transport network 14. There is a terminal network element 16 located between the domains A, B. FIG. 14 is a diagram of an example terminal element 16, 20, and FIG. 15 is a diagram of a controller 200 associated with the example terminal element 16, 20. The domain C can be referred to as the far-end handoff domain and includes a router 18. There is a terminal network element 20 located between the domains B, C.

Thus, the domains A, C are packet domains, and the domain B is a TDM domain. An end-to-end service can provide packet connectivity, between the routers 12, 18, through the domain B. This connectivity in the domains A, C can be UNI connections. The domain B can be an OTN network 14, between the terminal network elements 16, 20.

Figure 1:
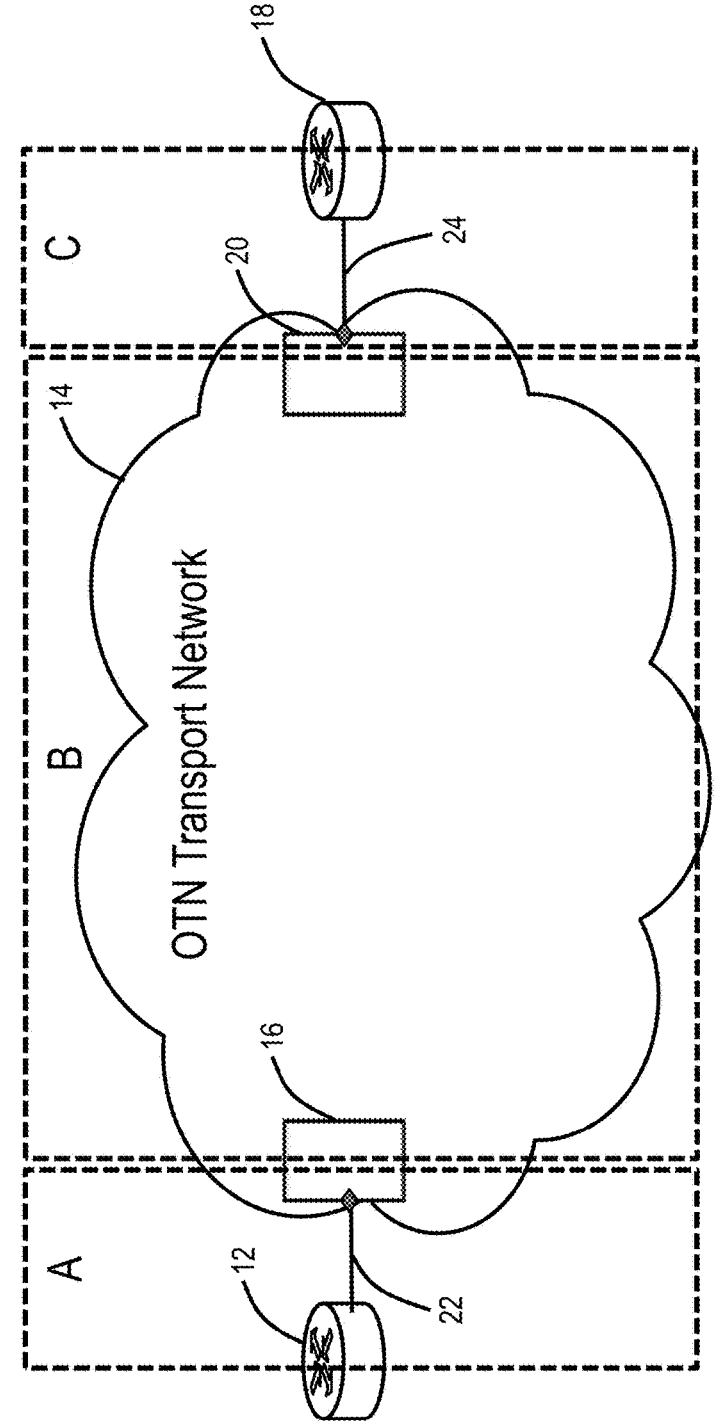
FIGS. 1-4 are network diagrams illustrating a multi domain network having domains A, B, C for illustrating the problem statement (FIGS. 1-3) and the solution (FIG. 4).

In FIG. 1, the problem statement addressed herein can be summarized as how to connect to the routers 12, 18 across the OTN network 14 with no single point of failure and independent failure tolerance in fault domains A, B, C. As described herein, a single point of failure means one failure that takes down the service, between the routers 12, 18, and independent failure tolerance in fault domains A, B, C means an ability to overcome multiple failures in each of the domains A, B, C, namely a failure in one domain does not affect the other domains. In FIG. 1, the routers 12, 18 are connected to the terminal network elements via a single link 22, 24, i.e., these are a single point of failure in the domains A, C. Note, FIG. 1 does not illustrate connectivity in the domain B.

Figure 2:
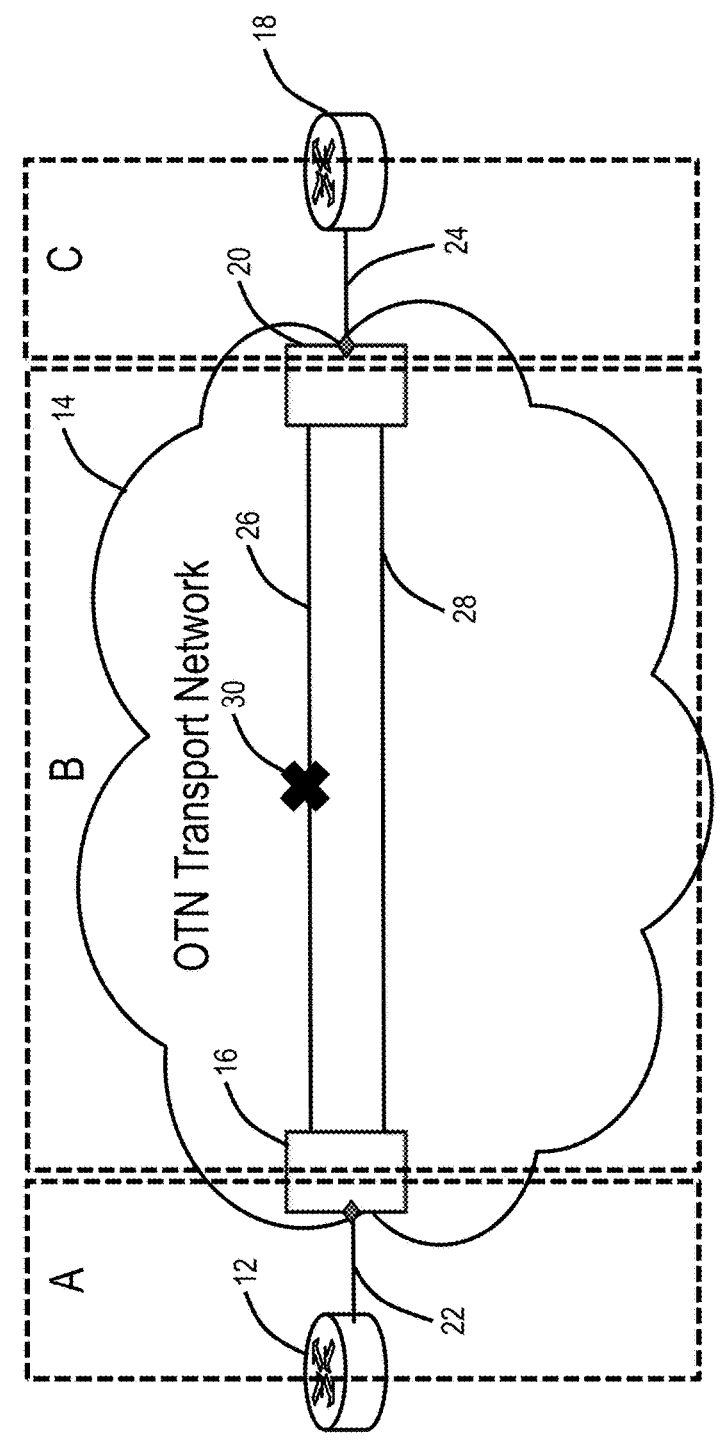

FIG. 2 illustrates 1+1 protection in the OTN transport network 14, between the terminal network elements 16, 20, namely a working path 26 and a protection path 28. The OTN network 14 can support one path failure, e.g., a fault 30 causes a switch from the working path 26 to the protection path 28, but the unprotected drops in the domains A, C are single points of failure, i.e., the single link 22, 24.

Figure 3:
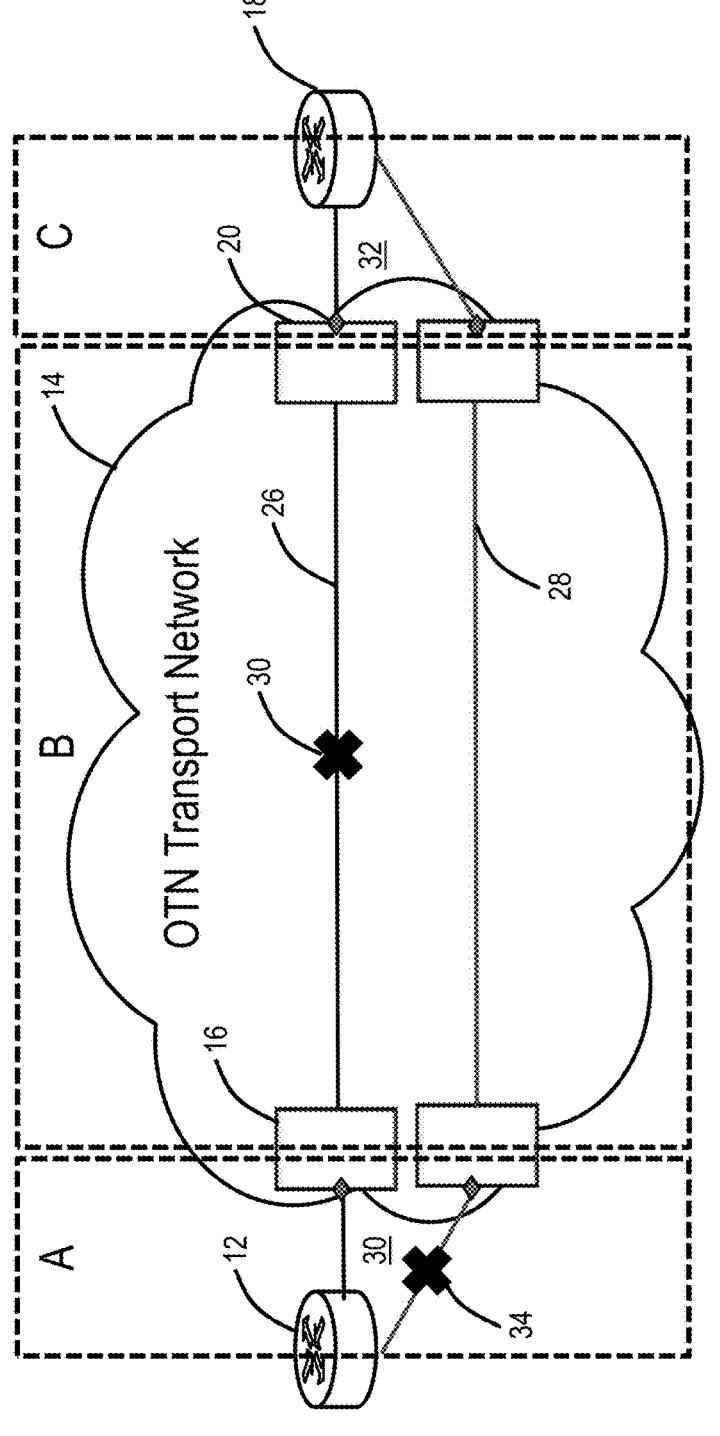

FIG. 3 illustrates protection in the domains A, C via a LAG 30, 32. The LAG 30, 32 is illustrated as an example with two ports or legs. Here, the OTN network 14 is configured to create LAG legs between the routers 12, 18 ensuring no single point of failure, namely one leg connects through the working path 26, and the other leg connects through the protection path 28, but this does not provide independent resilience between fault domains A, B, C. One path must be fault free in all three domains A, B, C to support the end-to-end service. For example, assuming a fault 34 in the domain A, if there is a fault in the domain B on the same line, this is protectable. However, assuming there is the fault 30 in the domain B on the other link, this is not protectable, i.e., this does not support independent failure tolerance. That is, the end-to-end service will be down even though there is only one fault in two of the domains A, B.

Solution

Figure 4:
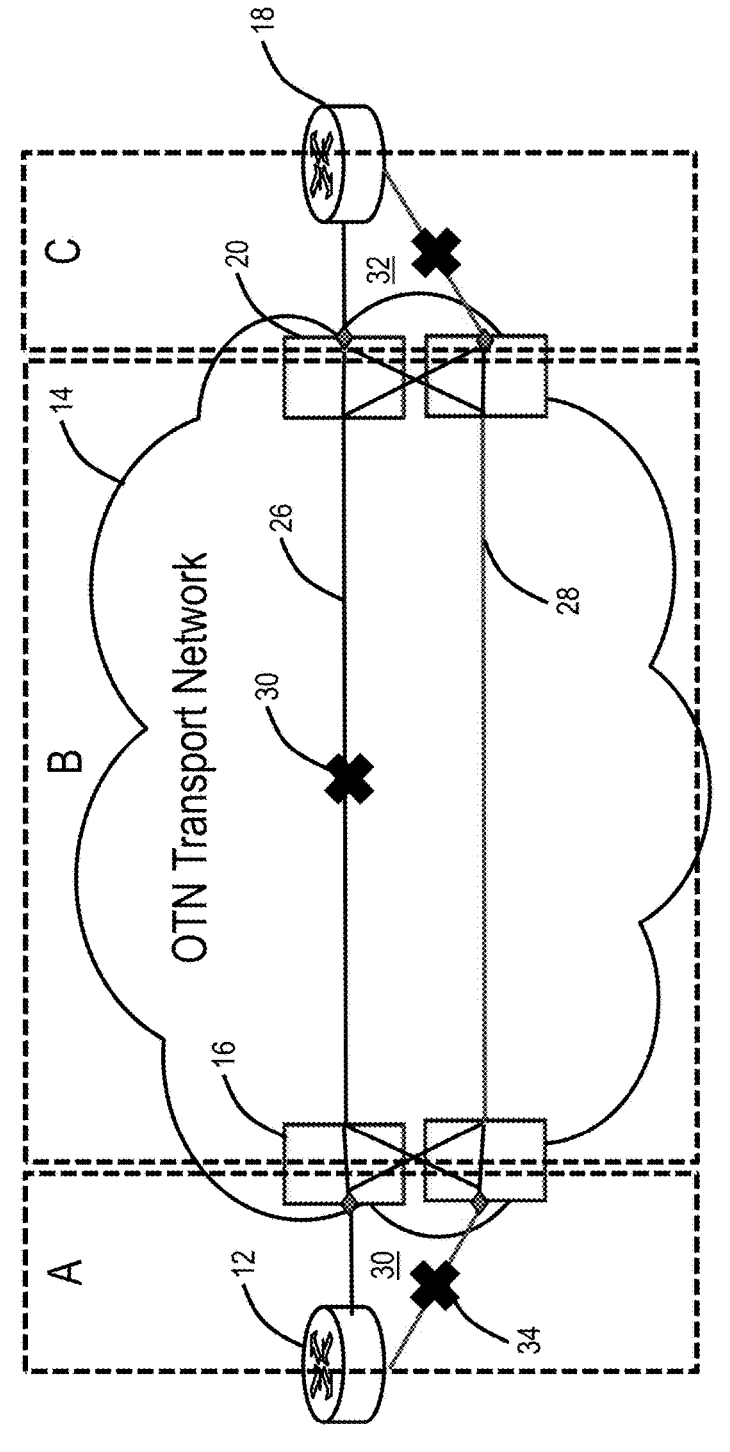

FIG. 4 illustrates the solution to the problem, with no single point of failure and independent failure tolerance in fault domains A, B, C. By closing and reopening protected handoff from drop side to OTN network 14 side, we can tolerate one independent path failure per fault domain. This requires answering how to make a protected handoff using OTN switching techniques on one side and packet switching techniques on the other.

Of note, FIGS. 3 and 4 illustrate two boxes for the terminal network element 16, 20. This does not indicate two separate network elements 16, 20, but rather two ports on each of the terminal network elements 16, 20, to support 1+1 protection in the OTN network 14. The closing and reopening protected handoff is performed within the terminal network element 16, 20.

To achieve fault independence between the near-end packet domain A, the transport TDM domain B, and the far-end packet domain C, the present disclosure closes the near-end LAG 30 protection in the domain A, and opens TDM protection over the transport network 14. At the far-end packet domain C, the transport protection is closed and far-end LAG 32 protection is reopened. As such each domain can have an arbitrary failed segment and the end-to-end service stays up. Failures in the transport domain B are resolved by TDM switching which typically has higher performance that LAG switching, in the packet domains A, C.

Figure 5:
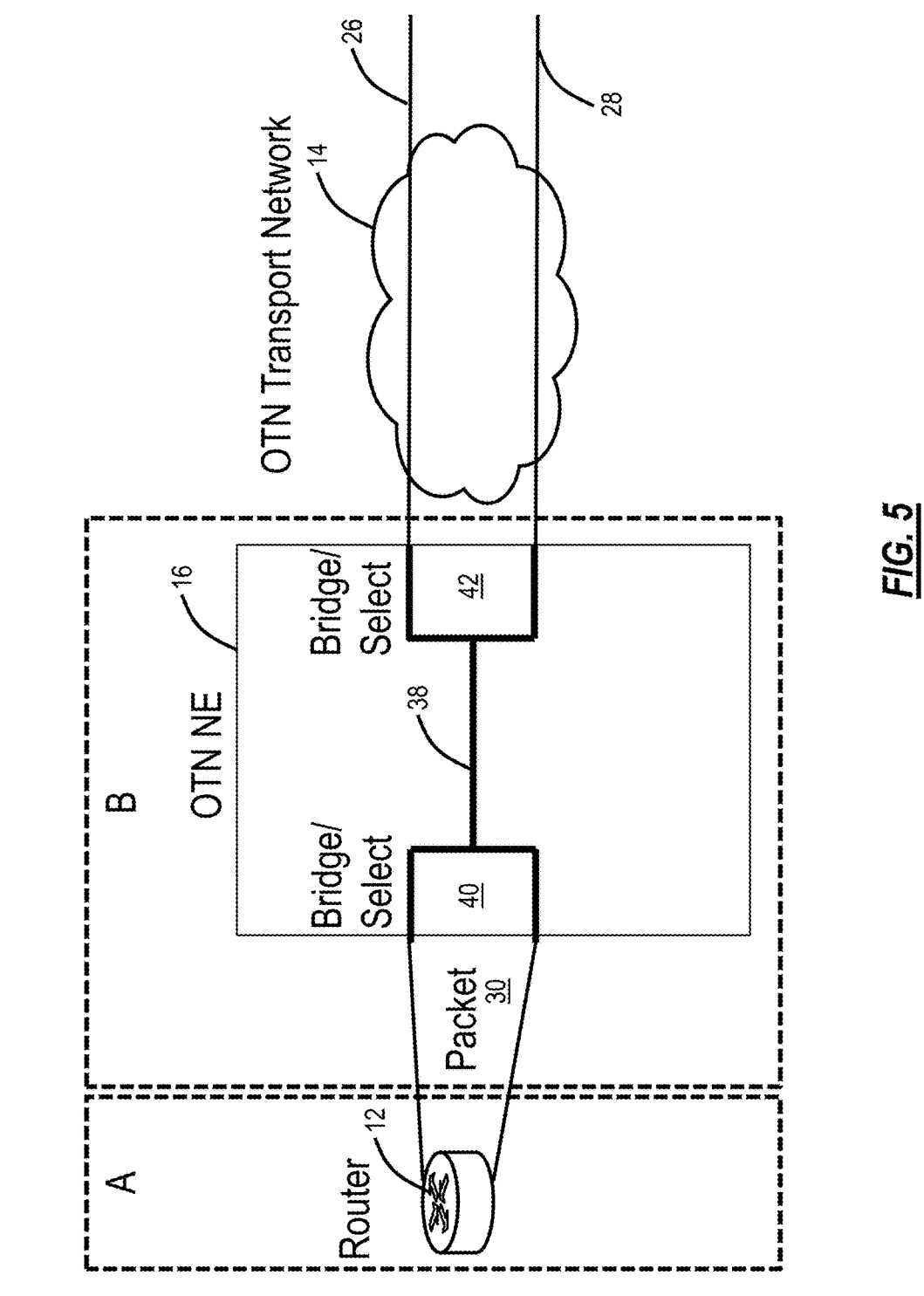
FIG. 5 is a network diagram illustrating logical connectivity in the domains A, B in the OTN network element for a protected handoff using OTN switching techniques on one side and packet switching techniques on the other.

Protected Handoff Using OTN Switching Techniques on One Side and Packet Switching Techniques on the Other FIG. 5 is a network diagram illustrating logical connectivity in the domains A, B in the terminal network element 16 for a protected handoff using OTN switching techniques on one side and packet switching techniques on the other. That is, because a service uses Ethernet in the domains A, C, and Ethernet over OTN in the domain B, there is a requirement to handoff in a protected manner in the OTN network 14 as well as between the router 12 and the terminal network element 16. As described herein, the handoff can be referred to as closing and reopening protection. Logically, this handoff (closing and reopening protection) is performed via two bridge and select functions within the terminal network element 16. For illustration purposes, FIG. 5 illustrates one side of the network 10; of course, there can be corresponding equipment and functionality in the domains B, C.

In FIG. 5, the terminal network element 16 is shown facing the router 12 in the domain A and the OTN network 14. The terminal network element 16 must be configured to handoff protected in both directions, namely with the router 12 and with the OTN network 14. Of note, the terminal network element 16 has a connection 38 within the network element, i.e., in a fabric. Further, terminal network element 16 has a packet 2:1 bridge and select function 40 facing the router 12 in the domain A, and an OTN 2:1 bridge and select function 42 facing the OTN network 14, with the packet 2:1 bridge and select function 40 interconnected to the OTN 2:1 bridge and select function 42 via the connection 38 in the fabric.

A 2:1 bridge and select function 40, 42 operates in one direction as a bridge where connectivity from the single connection is bridged to two separate connections and in the other direction as a select where connectivity from only one of the two separate connections is provided to the single connection. Key to providing no single point of failure and independent failure tolerance in fault domains A, B, C, the terminal network element 16 has two separate bridge and select functions 40, 42, one in the packet domain A and one in the OTN domain B.

Of note, the bridge and select functions 40, 42 are inverted relative to one another. That is, the connection 38 is being bridged to by both the bridge and select functions 40, 42.

The present disclosure describes example physical implementations of the bridge and select functions 40, 42. The bridge and select function 42 can be referred to as an OTN 2:1 bridge and select function.

The OTN 2:1 bridge and select function 42 can utilize 2WAYDPR (Dual Bidirectional Path Ring) in an OTN switching fabric. The OTN 2:1 bridge and select function 42 can be implemented in circuitry in an OTN switching fabric, in the terminal network element 16. From left-to-right (from the router 12 to the OTN network 14), this circuitry takes the connection 38 and bridges it to two separate OTN connections, both of which are transported (1+1) in the OTN network 14, over the working path 26 and the protection path 28. From right-to-left (from the OTN network 14 to the router 12), this circuitry takes the separate OTN connections and selects one to send to the single connection 38.

The packet 2:1 bridge and select function 40 can include various implementations, including a so-called packet LAG drop (FIG. 6) and a so-called OTN LAG drop (FIGS. 7 to 13).

Figure 6:
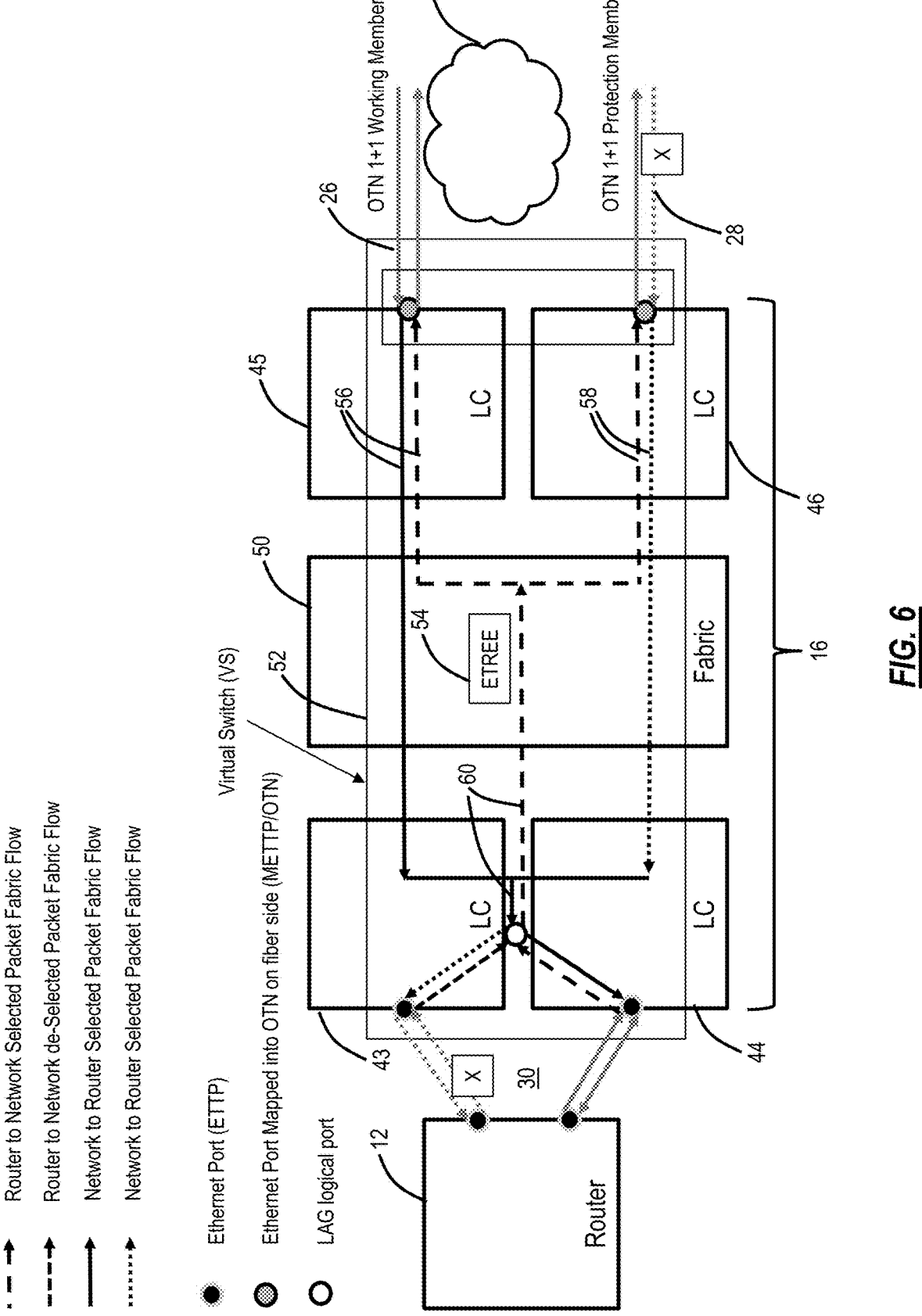
FIG. 6 is a network diagram, illustrating a packet 2:1 bridge and select function utilizing a so-called packet LAG drop.

In an embodiment, the packet 2:1 bridge and select function can be the so-called packet LAG drop (FIG. 6). The packet LAG drop utilizes a virtual switch (VS) in the terminal network element 16 and an Ethernet Tree (ETREE) between a root port and 2 leaf ports, to implement the packet 2:1 bridge and select function 40.

In another embodiment, the packet 2:1 bridge and select function 40 can be the so-called OTN LAG drop (FIGS. 7 to 13). The OTN LAG drop implements a manual LAG function and introduction of forced errors on the inactive leg. As described herein, the manual LAG is one without use of LAG Control Protocol (LACP) and where there is only one leg of the LAG active at a time. Of note, manual LAG is not a standardized implementation, but many vendors support an implementation.

Packet LAG Drop

Referring to FIG. 6, the packet LAG drop is illustrated with connectivity between components/functions in the terminal network element 16 and the router 12. Again, those skilled in the art will recognize there are similar components/functions at the terminal network element 20 and the router 18.

For ease of illustration, the terminal network element 16 is illustrated with two line cards (LCs) 43, 44 connected to the router 12, two LCs 45, 46 connected the OTN network 14, and a fabric 50 in-between. Those skilled in the art will appreciate these boxes (components 43, 44, 45, 46, 50) are presented for functionally describing the terminal network element 16, and there can be various physical implementations; all of which are contemplated. That is, each box does not necessarily need to a separate hardware module. Those skilled in the art will also appreciate the terminal network element 16 can realized in various physical implementations, all of which are contemplated herein.

The LCs 43, 44, 45, 46 can include one or more ports, where the ports can be an Ethernet port (e.g., Ethernet Trail Termination Point (ETTP)), an Ethernet port mapped into OTN on the fiber side (to the network 14), or a logical LAG port.

The OTN 2:1 bridge and select function 42 is formed by the fabric 50 and the LCs 45, 46. There are two ports (Ethernet port mapped into OTN on the fiber side) on the LCs 45, 46 forming the working connection 26 and the protection connection 28, i.e., OTN 1+1 Automatic Protection Switching (APS) linear protection group—the APS selection is in the fabric 50.

For the packet 2:1 bridge and select function 40, this implementation utilizes a virtual switch (VS) 52 between the LCs 43, 44, 45, 46 and an ETREE 54 where two leaf nodes 56, 58 face the fabric 50 and a root node 60 faces the two ports of the LAG 30 connected to the router 12. The ETREE 54 acts as the bridge/selector along with the help of a 1+1 engine providing squelching, i.e., only sending packets on one link after the root node 60 in the ETREE 54 based on the 1+1 engine evaluating OTN the working connection 26 and the protection connection 28 status and making a selection. The squelching can be via Interlaken (ILKN) which supports a function of squelching a deselected path (break before make). For example, in FIG. 6, the dotted line from the root node can be deselected.

The flow can be as follows:

From the router 12 to the network 14: ETREE (with Media Access Control (MAC) learning disabled) acting as the bridge of traffic sourced at LAG logical port.

From the network 14 to the router 12: a 1+1 engine evaluates OTN Working and Protection status and makes a selection, the deselected path is ingress squelched (break before make)

Figure 7:
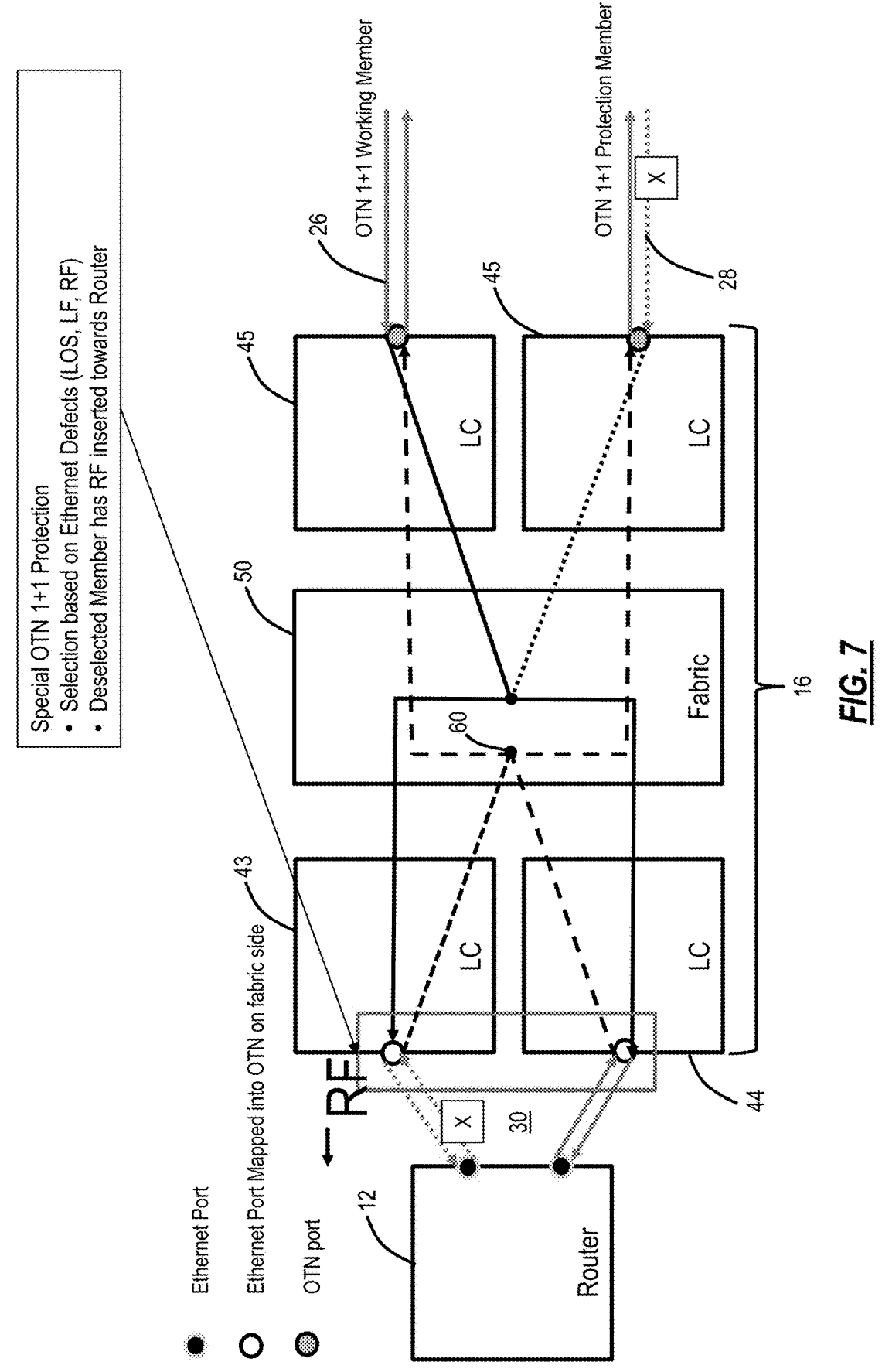
FIGS. 7 to 13 are network diagrams illustrating packet 2:1 bridge and select function utilizing a so-called OTN LAG drop.

Various circles in FIGS. 6 and 7 include logical points, such as an Ethernet Trail Termination Point (ETTP), mETTP/OTN point which connects to an OTN point, and a LAG point.

OTN LAG Drop

Referring to FIG. 7, similarly, the OTN LAG drop is illustrated with connectivity between components in the terminal network element 16 and the router 12. Again, as in FIG. 6, for ease of illustration, the terminal network element 16 includes two LCs 43, 44 connected to the router 12, two LCs 45, 46 connected to the OTN network 14, and a fabric 50 in-between. Again, those skilled in the art will appreciate other implementations are contemplated.

The OTN 2:1 bridge and select function 42 (right side) is the same as described in FIG. 6.

For the packet 2:1 bridge and select function 40, the implementation utilizes another 2WAYDPR function 60 in the fabric 50 where the single connection is split to both a working and protect port on the LCs 45, 46. A key aspect here is to be able to make a selection of the working and protect port on the LCs 43, 44, in the presence of no faults, i.e., both the working and protect ports are able to carry traffic. Since this is a manual LAG, there is no coordination via the LAG 30 ports via LACP. To solve this, manual faults are inserted on the unselected leg, namely Ethernet Remote Faults (RF). Of note, we selected RF because this means the leg can still be monitored (versus a Loss of Signal (LOS)), but the LAG port on the unselected leg will not have traffic.

FIGS. 8-13 provided detailed explanations of functionality of the OTN LAG drop, illustrating both sides of an end-to-end service between the routers in the domains A, C and the transport network in the domain B.

Figure 8:
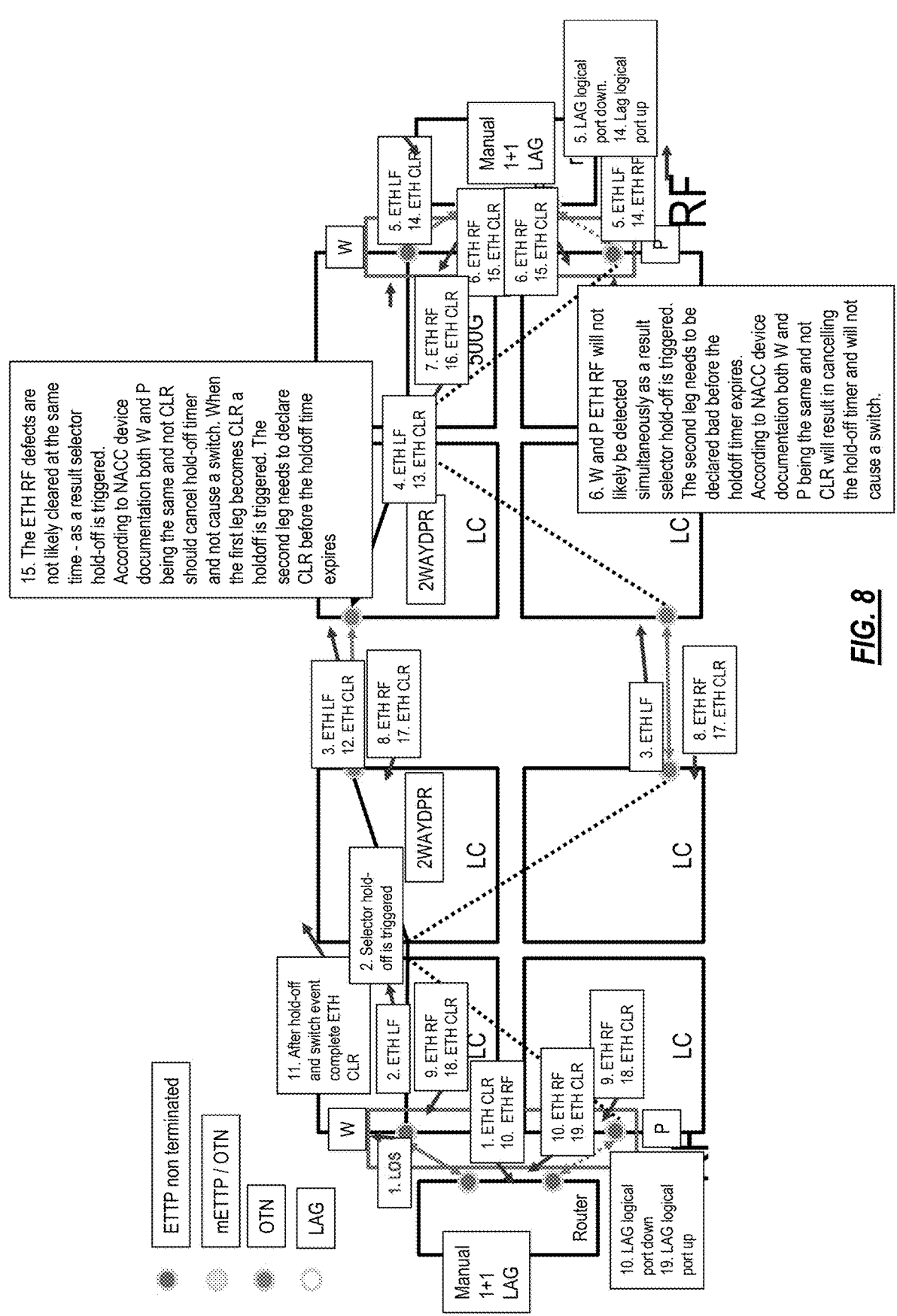

FIG. 8 illustrates an active drop side receive fiber cut, namely between the router 12 and the terminal network element 16.

Figure 9:
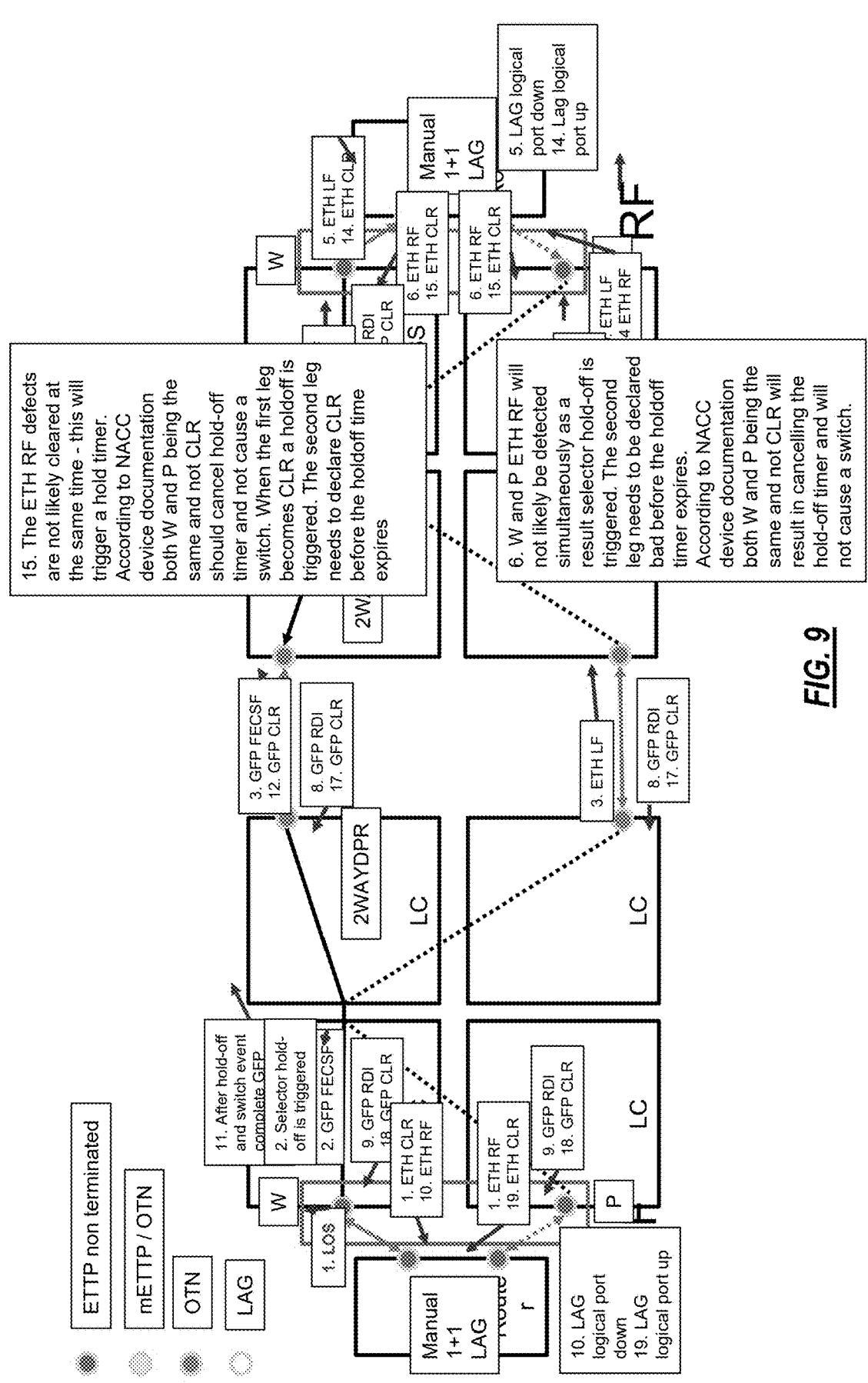

FIG. 9 illustrates an active drop side receive fiber cut, namely between the router and the OTN network element on the left side, and using Generic Framing Protocol (GFP). Of note, GFP will require different messages.

Figure 10:
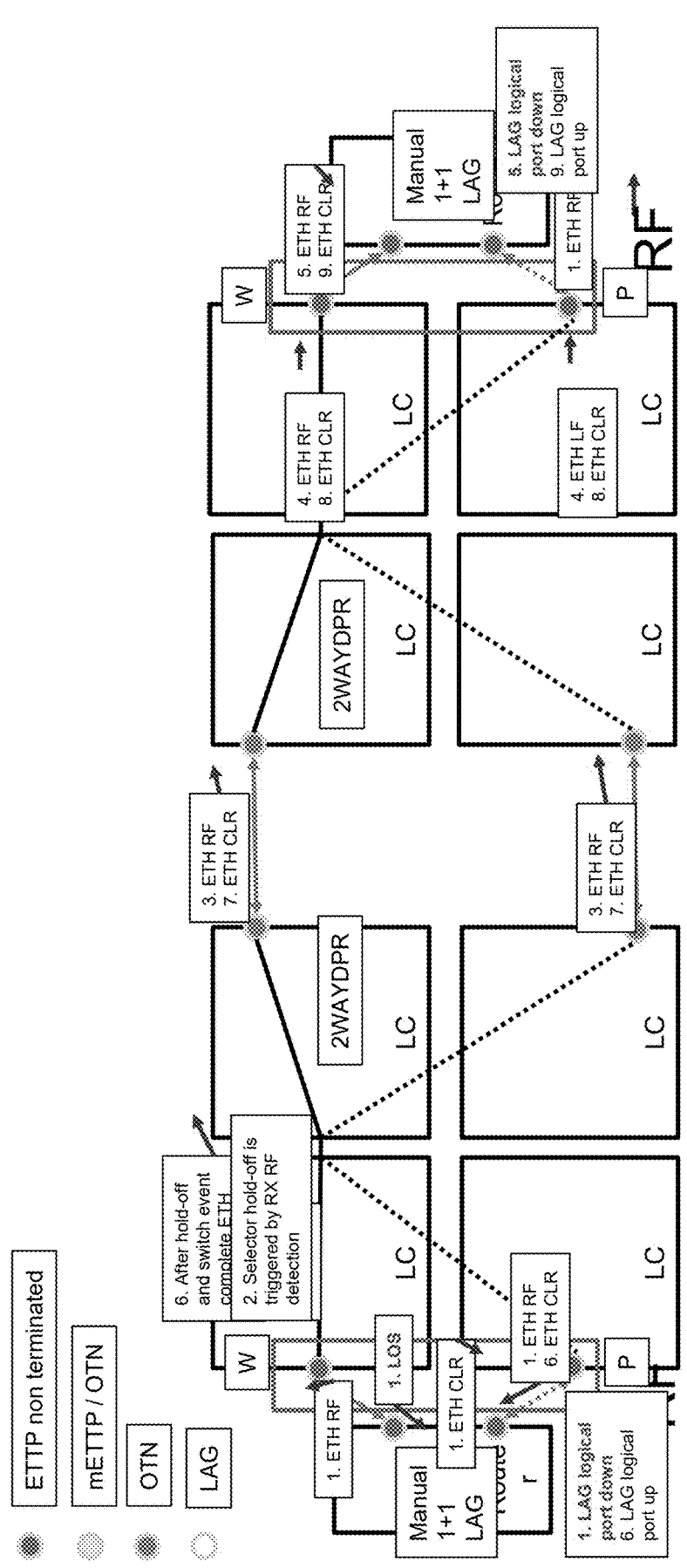

FIG. 10 illustrates an active drop side transmit fiber cut, namely between the router and the OTN network element on the left side.

Figure 11:
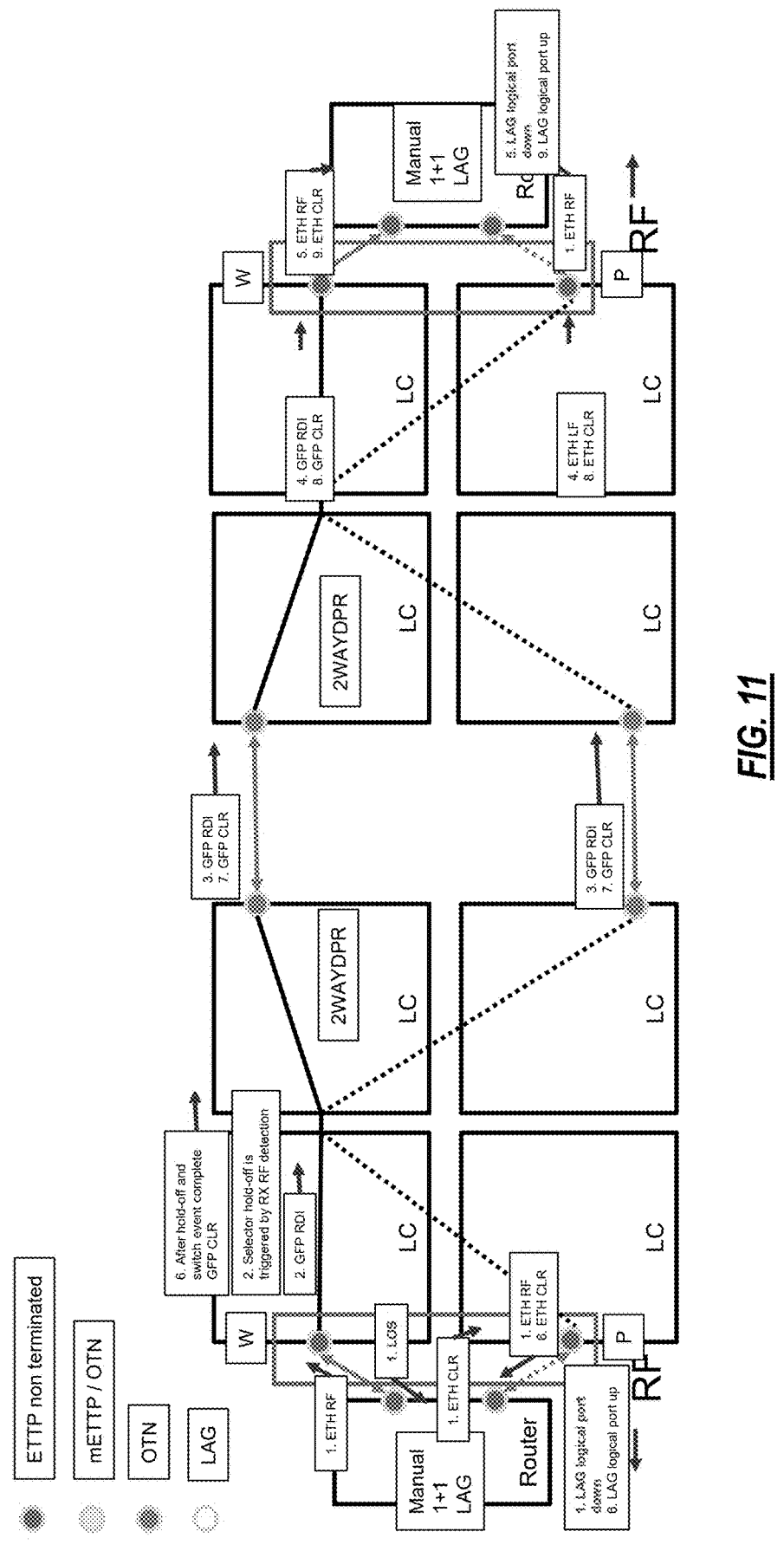

FIG. 11 illustrates an active drop side transmit fiber cut, namely between the router and the OTN network element on the left side, and using Generic Framing Protocol (GFP).

Figure 12:
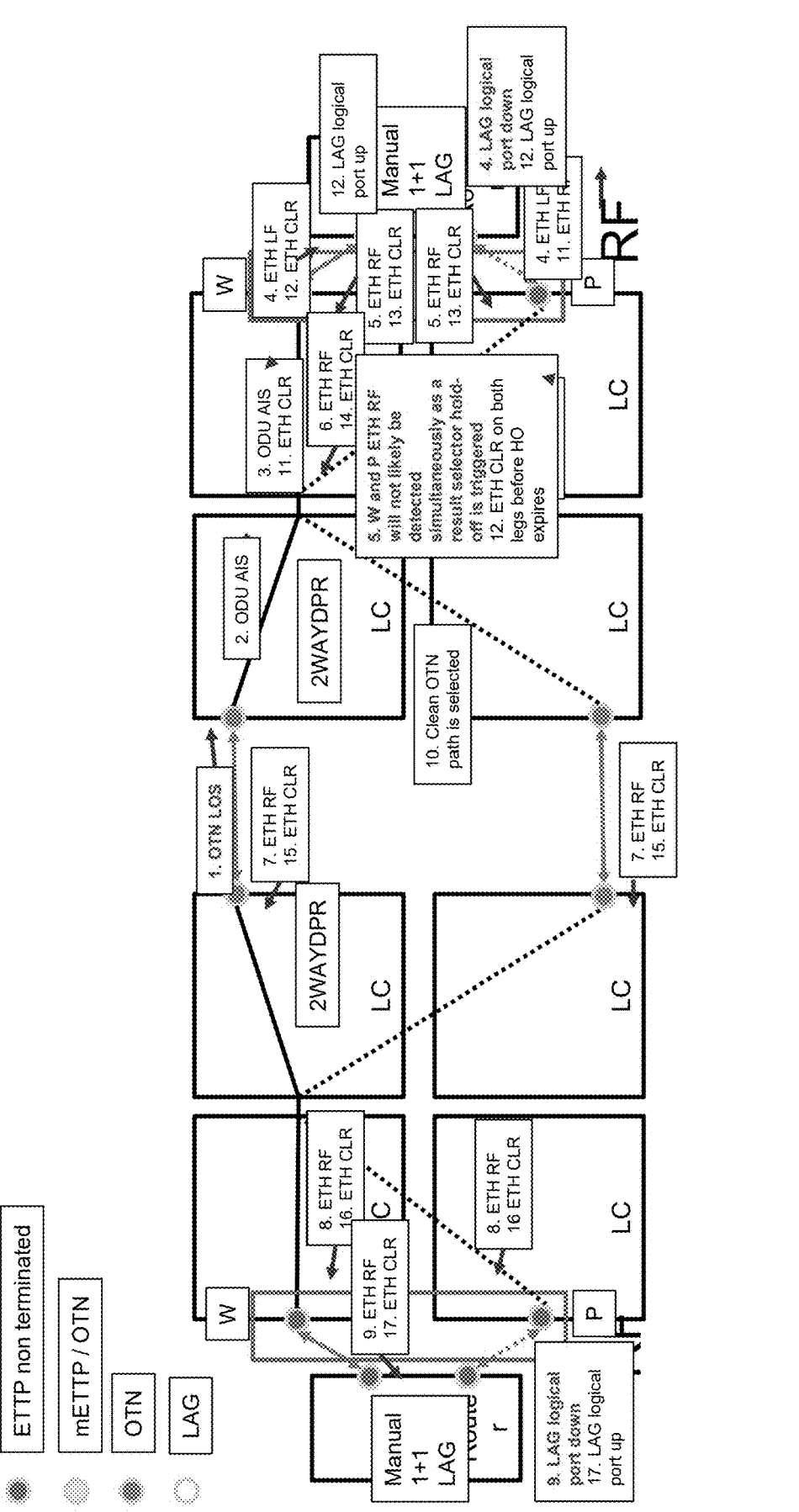

FIG. 12 illustrates an active drop side transport link fiber cut, namely within the OTN network.

Figure 13:
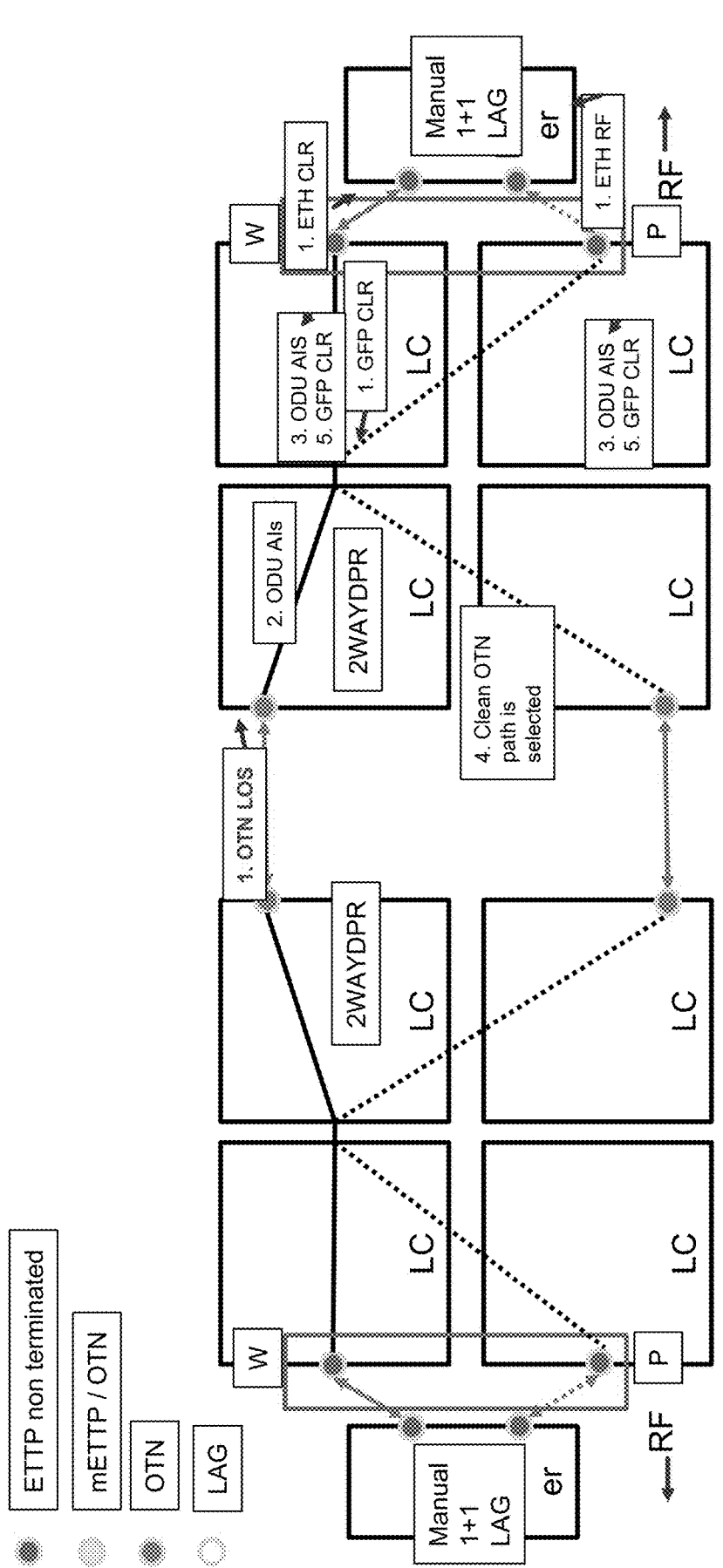

FIG. 13 illustrates an active drop side transport link fiber cut, namely within the OTN network, and using Generic Framing Protocol (GFP).

Example Network Element

FIG. 14 is a block diagram of an example terminal network element 16, 20 for use with the systems and methods described herein. In an embodiment, the network element 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 16, 20 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the network element 16, 20 can be any digital system with ingress and egress digital signals and switching of channels, timeslots, tributary units, etc., as well as ab optical system with ingress and egress of optical channels.

In an embodiment, the network element 16, 20 includes common equipment 132, ports 134, and one or more switch modules 136. The common equipment 132 can include power; a control module; Operations, Administration, Maintenance, and Provisioning (OAM&P) access; user interface ports; and the like. The common equipment 132 can connect to a management system 138 through a data communication network 140 (as well as a Path Computation Element (PCE), Software Defined Networking (SDN) controller, etc.). The management system 138 can include a Network Management System (NMS), Element Management System (EMS), or the like. Additionally, the common equipment 132 can include a control plane processor, such as a controller 200 illustrated in FIG. 15. The network element 16, 20 can include an interface 142 for communicatively coupling the common equipment 132, the ports 134, and the switch modules 136 to one another. For example, the interface 142 can be a backplane, midplane, a bus, optical or electrical connectors, or the like. The ports 134 are configured to provide ingress and egress to the switch modules 136 and to external connections on the links to/from the network element 16, 20. In an embodiment, the ports 134 can form ingress and egress switches with the switch modules 136 as center stage switches for a three-stage switch, e.g., a three-stage Clos switch. Other configurations and/or architectures are also contemplated. The ports 134 can include optical transceivers, including pluggable optical modules and the like, electrical transceivers, etc.

Further, the ports 134 can include a plurality of connections per module and each module may include a flexible rate support for any type of connection. The ports 134 can include wavelength division multiplexing interfaces, short reach interfaces, and the like, and can connect to other ports 134 on remote network elements, end clients, edge routers, and the like, e.g., forming connections on the links in the network 10. From a logical perspective, the ports 134 provide ingress and egress ports to the network element 16, 20, and modules can include one or more physical ports 134. The switch modules 136 are configured to switch channels, timeslots, tributary units, packets, etc. between the ports 134. For example, the switch modules 136 can provide wavelength granularity (Layer 0 switching); OTN granularity (Layer 1 switching); packet switching; and the like. Specifically, the switch modules 136 can include Time Division Multiplexed (TDM) (i.e., circuit switching) and/or packet switching engines. The switch modules 136 can include redundancy as well, such as 1:1, 1:N, etc.

Those of ordinary skill in the art will recognize the network element 16, 20 can include other components which are omitted for illustration purposes, and that the systems and methods described herein are contemplated for use with a plurality of different network elements with the network element 16, 20 presented as an example type of network element. For example, in another embodiment, the network element 16, 20 may not include the switch modules 36, but rather have the corresponding functionality in the line modules 34 (or some equivalent) in a distributed fashion. In a further embodiment, the network element 30 may not include modules, but rather be an integrated device. That is, the components 132, 134, 136 can be viewed as functional components that may be realized in any manner. For the network element 16, 20, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the network element 16, 20 is merely presented as one network element 16, 20 for the systems and methods described herein.

Again, those of ordinary skill in the art will recognize the network element 16, 20 can include other components which are omitted for illustration purposes, and that the systems and methods described herein are contemplated for use with a plurality of different network elements with the network element 16, 20 presented as an example type of network element. For example, in another embodiment, the network element 16, 20 may include corresponding functionality in a distributed fashion. In a further embodiment, the chassis and modules may be a single integrated unit, namely a rack-mounted shelf where the functionality is built-in, i.e., a "pizza-box" configuration. That is, FIG. 14 is meant to provide a functional view, and those of ordinary skill in the art will recognize actual hardware implementations may vary; all of which are contemplated herewith.

Example Controller

FIG. 15 is a block diagram of an example processing device 200. The processing device 200 can be part of the terminal network element 16, 20. Also, the processing device 200 can be referred to in implementations as a control module, a shelf controller, a shelf processor, a system controller, etc. The processing device 200 can be configured to perform the various functions described herein. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Process

FIG. 16 is a flowchart of a process 300 for a LAG 1+1 handoff. The process 300 contemplates implementation as a method having steps, via the terminal network element 16, 20 with circuitry configured to implement the steps, via circuitry configured to implement the steps, and the like. The process 300 includes performing a first bridge and select function to convert Link Aggregation protection associated with a first set of ports, configured to connect to a router via a Link Aggregation, to a single connection (step 302); and performing a second bridge and select function to convert the single connection to 1+1 protection associated with a second set of ports, configured to communicatively connect to a terminal network element over a Time Division Multiplexing (TDM) network (step 304).

The first bridge and select function and the second bridge and select function are each configured to close one type of protection and open another type of protection. The process 300 can further include switching the single connection via a TDM switching fabric; and implementing the first bridge and select function and the second bridge and select function, via the TDM switching fabric. The performing the second bridge and select function can include implementing (1) a bridge of the single connection to the second set of ports and (2) a select from the second set of ports to the single connection.

The performing the first bridge and select function can include implementing a packet Link Aggregation Group (LAG) which utilizes a virtual switch and an Ethernet Tree (ETREE) to (1) select from the first set of ports to the single connection and (2) bridge from the single connection to the first set of ports. The TDM network can utilize Optical Transport Network (OTN). The performing the first bridge and select function can include implementing an OTN Link Aggregation Group (LAG) which (1) manually introduces errors on an inactive leg of the first set of ports to select from the first set of ports to the single connection and (2) bridges from the single connection to the first set of ports.

The performing the first bridge and select function can include manually introducing errors on an inactive leg of the first set of ports to select from the first set of ports to the single connection and (2) bridge from the single connection to the first set of ports. The process 300 can further include, responsive to a failure in the TDM network, holding off protection switching to the Link Aggregation so that the 1+1 protection is implemented first.

Example Network Application

Figure 17:
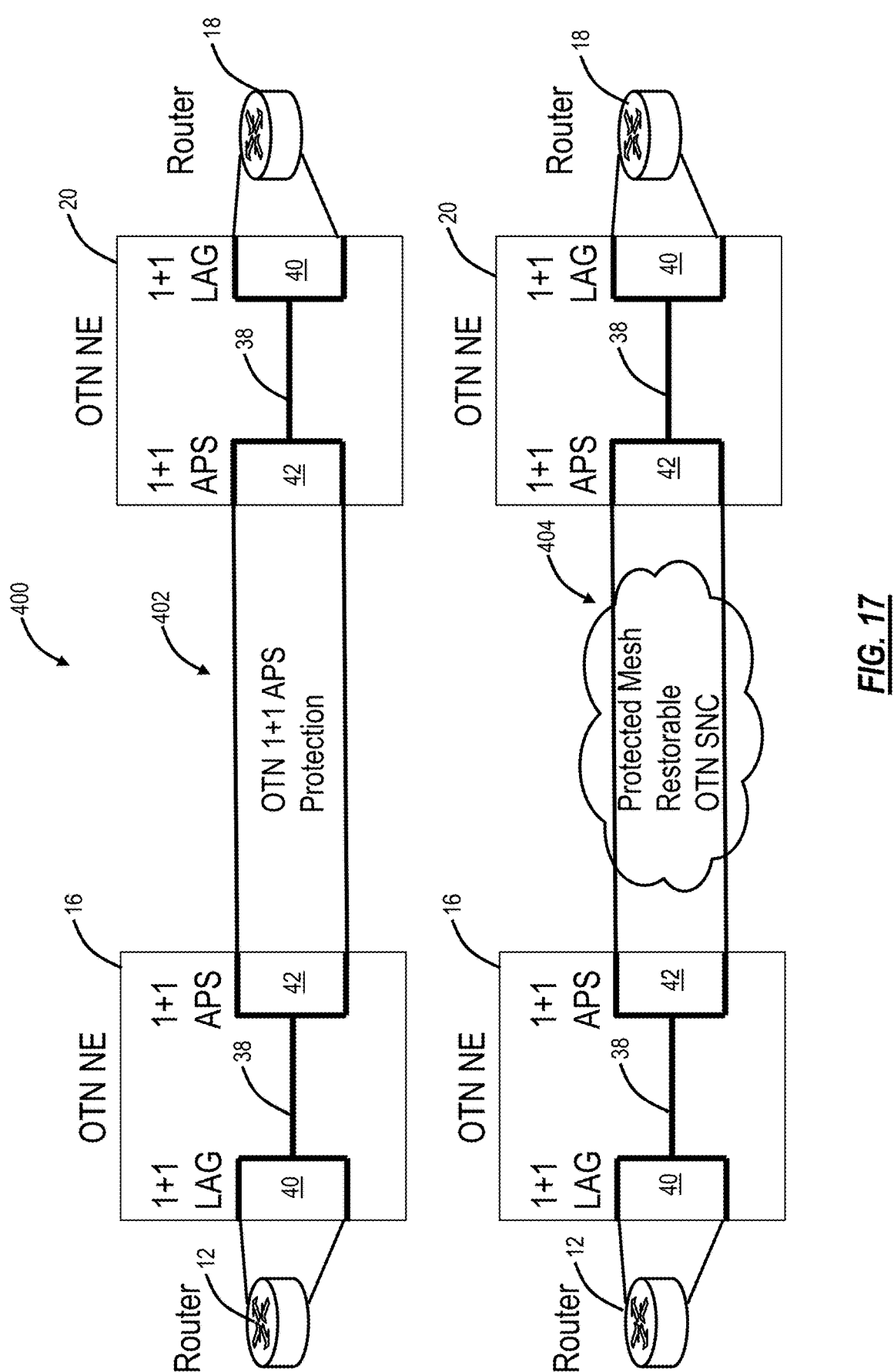
FIG. 17 is a network diagram of a network illustrating two example applications for the LAG 1+1 handoff process.

FIG. 17 is a network diagram of a network 400 illustrating two example applications for the LAG 1+1 handoff process 300. In an embodiment, the LAG 1+1 handoff process 300 can be used to interconnect the two routers 12, 18 via OTN 1+1 APS protection 402. In another embodiment, the LAG 1+1 handoff process 300 can be used to interconnect the two routers 12, 18 a protected, mesh restorable OTN subnetwork connection (SNC). Of course, those skilled in the art will appreciate other example applications are also contemplated with the LAG 1+1 handoff process 300.

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A network element comprising:

a plurality of ports including a first set of ports configured to connect to a router via a Link Aggregation and a second set of ports configured to communicatively connect to another network element via 1+1 protection over a Time Division Multiplexing (TDM) network; and circuitry interconnecting the plurality of ports and configured to perform a first bridge and select function to convert the Link Aggregation protection associated with the first set of ports to a single connection, wherein the first bridge and select function comprises a virtual switch implementing an Ethernet Tree (ETREE) having two leaf ports on a fabric-facing side of the ETREE coupled to the single connection and a root port on a router-facing side of the ETREE coupled to the first set of ports, and wherein the circuitry is further configured to select between the leaf ports by ingress squelching which performs blocking in a break-before-make manner on an inactive path using an Interlaken (ILKN) interface in response to a status evaluation of the 1+1 protection based on at least one working-path status indicator and at least one protection-path status indicator, and perform a second bridge and select function to convert the single connection to the 1+1 protection associated with the second set of ports.

2. The network element of claim 1, wherein the first bridge and select function and the second bridge and select function are each configured to close one type of protection and open another type of protection, and wherein the ingress squelching via the Interlaken (ILKN) interface facilitates closing the Link Aggregation protection.

3. The network element of claim 1, further comprising a TDM switching fabric configured to switch the single connection.

4. The network element of claim 1, wherein, to perform the second bridge and select function, the circuitry is configured to implement (1) a bridge of the single connection to the second set of ports and (2) a select from the second set of ports to the single connection.

5. The network element of claim 1, wherein, to perform the first bridge and select function, the circuitry is configured to implement a packet Link Aggregation Group (LAG) which utilizes a virtual switch in the terminal network element and the Ethernet Tree (ETREE) to (1) select from the first set of ports to the single connection and (2) bridge from the single connection to the first set of ports.

6. The network element of claim 1, wherein the TDM network utilizes Optical Transport Network (OTN).

7. The network element of claim 6, wherein, to perform the first bridge and select function, the circuitry is configured to implement an OTN Link Aggregation Group (LAG) which (1) manually introduces errors on an inactive leg of the first set of ports to select from the first set of ports to the single connection and (2) bridges from the single connection to the first set of ports.

8. The network element of claim 1, wherein, to perform the first bridge and select function, the circuitry is configured to (1) manually introduce errors on an inactive leg of the first set of ports to select from the first set of ports to the single connection and (2) bridge from the single connection to the first set of ports.

9. The network element of claim 1, wherein, responsive to a failure in the TDM network, the circuitry is configured to holdoff protection switching to the Link Aggregation so that the 1+1 protection is implemented first.

10. A method comprising steps of:

performing a first bridge and select function to convert Link Aggregation protection associated a first set of ports, configured to connect to a router via a Link Aggregation, to a single connection, wherein the first bridge and select function comprises a virtual switch implementing an Ethernet Tree (ETREE) having two leaf ports on a fabric-facing side of the ETREE coupled to the single connection and a root port on a router-facing side of the ETREE coupled to the first set of ports, and wherein the steps further include selecting between the leaf ports by ingress squelching which performs blocking in a break-before-make manner on an inactive path using an Interlaken (ILKN) interface in response to a status evaluation of 1+1 protection based on at least one working-path status indicator and at least one protection-path status indicator; and performing a second bridge and select function to convert the single connection to the 1+1 protection associated with a second set of ports, configured to communicatively connect to a network element over a Time Division Multiplexing (TDM) network.

11. The method of claim 10, wherein the first bridge and select function and the second bridge and select function are each configured to close one type of protection and open another type of protection, and wherein the ingress squelching via the Interlaken (ILKN) interface facilitates closing the Link Aggregation protection.

12. The method of claim 10, wherein the steps further include switching the single connection via a TDM switching fabric; and implementing the first bridge and select function and the second bridge and select function, via the TDM switching fabric.

13. The method of claim 10, wherein the performing the second bridge and select function includes implementing (1) a bridge of the single connection to the second set of ports and (2) a select from the second set of ports to the single connection.

14. The method of claim 10, wherein the performing the first bridge and select function includes implementing a packet Link Aggregation Group (LAG) which utilizes a virtual switch and the Ethernet Tree (ETREE) to (1) select from the first set of ports to the single connection and (2) bridge from the single connection to first set of ports.

15. The method of claim 10, wherein the TDM network utilizes Optical Transport Network (OTN).

16. The method of claim 15, wherein the performing the first bridge and select function includes implementing an OTN Link Aggregation Group (LAG) which (1) manually introduces errors on an inactive leg of the first set of ports to select from the first set of ports to the single connection and (2) bridges from the single connection to the first set of ports.

17. The method of claim 10, wherein the performing the first bridge and select function includes manually introducing errors on an inactive leg of the first set of ports to select from the first set of ports to the single connection and (2) bridge from the single connection to the first set of ports.

18. The method of claim 10, wherein the steps further include responsive to a failure in the TDM network, holding off protection switching to the Link Aggregation so that the 1+1 protection is implemented first.

19. A switching circuit configured to perform steps of:

performing a first bridge and select function to convert Link Aggregation protection associated with a first set of ports, configured to connect to a router via a Link Aggregation, to a single connection, wherein the first bridge and select function comprises a virtual switch implementing an Ethernet Tree (ETREE) having two leaf ports on a fabric-facing side of the ETREE coupled to the single connection and a root port facing on a router-facing side of the ETREE coupled the first set of ports, and wherein the switching circuit is further configured to select between the leaf ports by ingress squelching which performs blocking in a break-before-make manner on an inactive path using an Interlaken (ILKN) interface in response to a status evaluation of 1+1 protection based on at least one working-path status indicator and at least one protection-path status indicator, and performing a second bridge and select function to convert the single connection to the 1+1 protection associated with a second set of ports, configured to communicatively connect to a network element over a Time Division Multiplexing (TDM) network.

20. The switching circuit of claim 19, wherein the first bridge and select function and the second bridge and select function are each configured to close one type of protection and open another type of protection, and wherein the ingress squelching via the Interlaken (ILKN) interface facilitates closing the Link Aggregation protection.

* * * * *